United States Patent [19]

Hannon, Jr.

[11] Patent Number: 5,022,271
[45] Date of Patent: Jun. 11, 1991

[54] PRESSURE SENSING DEVICE FOR PIPES

[76] Inventor: Dewey Hannon, Jr., 1308 Stevens St., Amory, Miss. 38821

[21] Appl. No.: 448,849

[22] Filed: Dec. 12, 1989

[51] Int. Cl.⁵ .............................................. G01L 7/02
[52] U.S. Cl. ...................................... 73/730; 73/715; 73/756
[58] Field of Search ................. 73/706, 715, 756, 730, 73/119 A, 700

[56] References Cited

U.S. PATENT DOCUMENTS

| | | | |
|---|---|---|---|
| 3,130,586 | 4/1964 | Taylor et al. | 73/730 |
| 3,563,095 | 2/1971 | Robinson, Jr. | 73/730 |
| 3,802,265 | 4/1974 | Wood | 73/715 |
| 3,863,504 | 2/1975 | Borsanyi . | |
| 4,218,926 | 8/1980 | De Visser | 73/730 |
| 4,321,833 | 3/1982 | Zeiringer | 73/730 |
| 4,425,800 | 1/1984 | Claassen et al. | 73/730 |
| 4,534,224 | 8/1985 | Raftis | 73/730 |
| 4,763,527 | 8/1988 | Raftis | 73/730 |
| 4,773,269 | 9/1988 | Knecht et al. | 73/706 |
| 4,809,589 | 3/1989 | Bertrand | 73/715 |
| 4,840,068 | 6/1989 | Mayhew, Jr. | 73/730 |

Primary Examiner—Joseph A. Orsino
Assistant Examiner—Brent A. Swarthout
Attorney, Agent, or Firm—Larson & Taylor

[57] ABSTRACT

A pressure sensing device is provided for sensing pipeline pressure particularly for pipes transporting corrosive or abrasive fluids and slurries where it is essential to isolate the instrumentation from the fluid in the pipeline. A body member is provided with a central bore with a recessed midportion in the body member extending 360° around the central bore. A replaceable sleeve member is screw-fit within the body member and has a recessed midportion to mate with the recessed midportion in the body member to form a chamber. A thin metal wall in the midportion of the sleeve member forms an end wall of the chamber within the body member. A plurality of outwardly extending pleats or folds are die-formed in the thin metal wall so as to permit the metal sleeve to readily move inwardly and outwardly in response to variations in pressures of fluid passing through the sleeve. A pressure sensing instrument is mounted on the body member and the chamber within the body member and sleeve is filled with fluid. When the device is coupled within a pipeline and fluids are passed therethrough the thin metal wall of the sleeve member senses pressure variations around the entire outer surfaces of the fluid stream.

4 Claims, 1 Drawing Sheet

PRESSURE SENSING DEVICE FOR PIPES

BACKGROUND OF THE INVENTION

The present invention relates to a pressure sensing device for use in pipelines transporting slurries, corrosive or abrasive fluids wherein it is essential to isolate the pressure gauge from the fluid being transported. A thin metal wall forming a portion of a removable sleeve serves as a means to transmit pressure signals from the fluid medium being transported within the pipeline to a liquid filled pressure sensing chamber operatively connected to a pressure gauge. The thin metal wall is provided with means to permit the wall to move inwardly and outwardly in response to small pressure changes.

There are numerous pressure gauges in the prior art which are particularly adapted to isolate the pressure media from the sensor. These devices provide for a diaphragm or membrane which forms a barrier between the media passing through the pipeline and a fluid filled chamber on the opposite side of the diaphragm with the fluid filled chamber being operatively connected to a pressure gauge. Thus, the diaphragm or membrane responds to pressure fluctuations within the fluid passing through the pipeline and transmits pressure signals to the fluid within the isolating chamber which in turn actuates the pressure gauge. Examples of such devices are the Classen U.S. Pat. No. 4,425,800, Borsanyi U.S. Pat. No. 3,863,504, Knecht U.S. Pat. No. 4,773,269 and Mayhew U.S. Pat. No. 4,840,068.

The Classen U.S. Pat. No. 4,425,800 discloses a device for determining the internal pressure in a fuel injection pipe system wherein a housing member has a wall portion of reduced thickness so as to act as a membrane and which transmits the pressure signals from the pipe system to a sensor device. The Borsanyi U.S. Pat. No. 3,863,504 discloses a pressure gauge wherein the instrument is separated from the pipeline by a flexible diaphragm. The Knecht U.S. Pat. No. 4,773,269 also provides a deflecting diaphragm member which senses a pressure within a chamber and by deflection of the diaphragm a change of resistance takes place in a strain gauge mounted on the diaphragm. The Mayhew U.S. Pat. No. 4,840,068 provides a pipe pressure sensor in which an elastomeric member is utilized as a flexible diaphragm disposed between a pipeline and a pressure sensing liquid chamber.

There are, however, problems in connection with the use of such prior art devices. Flexible elastomer diaphragms tend to absorb liquids and are damaged by corrosive media and slurry particles passing through the pipeline. Accordingly, the response of such diaphragms vary considerably depending upon the condition of the elastomer. Pressure sensors which utilize relatively thin metal walls as a means for separating the pipeline media from contact with the pressure gauge do not respond well to small pressure changes due to a lack of flexibility and, of course, such elements are subject to deterioration by corrosion and the like. Furthermore, not one of the prior art devices provides means for measuring pipe pressure around the entire circumference of the fluid stream. It can be appreciated that in large pipelines carrying heavy slurries the weight of the slurry itself will have an appreciable effect on pressure measurements and hence it is essential to provide a means for measuring the pressures around the entire fluid stream.

According to the present invention, there is provided a pressure sensing device which includes a readily replaceable sleeve having a thin walled metal member which serves as a pressure sensing diaphragm extending around the entire circumference of the fluid stream. The metal pressure sensing diaphragm is provided with means comprising pressed out accordion-like pleats or folds to permit movement of the diaphragm in response to small pressure changes so as to provide a highly accurate pipe pressure measuring device. Thus, the present invention overcomes the above-noted disadvantages of prior art pipeline pressure gauges by utilizing a thin walled metal diaphragm having accordion-like folds therein extending 360° around the periphery of a fluid stream to permit instantaneous response to small variations in pressure within the pipeline. The sensing diaphragm is mounted on a sleeve which is screw-fit within the body member with the pressure gauge mounted externally of the body member. Thus, the sleeve may be readily replaced in the event the diaphragm becomes damaged.

An object of the present invention is to provide a pipeline pressure sensor which utilizes a metallic diaphragm including accordion-like folds to ensure accuracy of pressure measurements.

Another object of the present invention is to provide a pressure sensing device for pipelines in which the pressure sensing diaphragm extends around the entire periphery of the fluid stream.

Other objects and many of the intended advantages will become more readily apparent upon consideration of the following detailed specification when considered in connection with the accompanying drawings wherein:

DETAILED DESCRIPTION OF THE DRAWINGS

Figure 1:
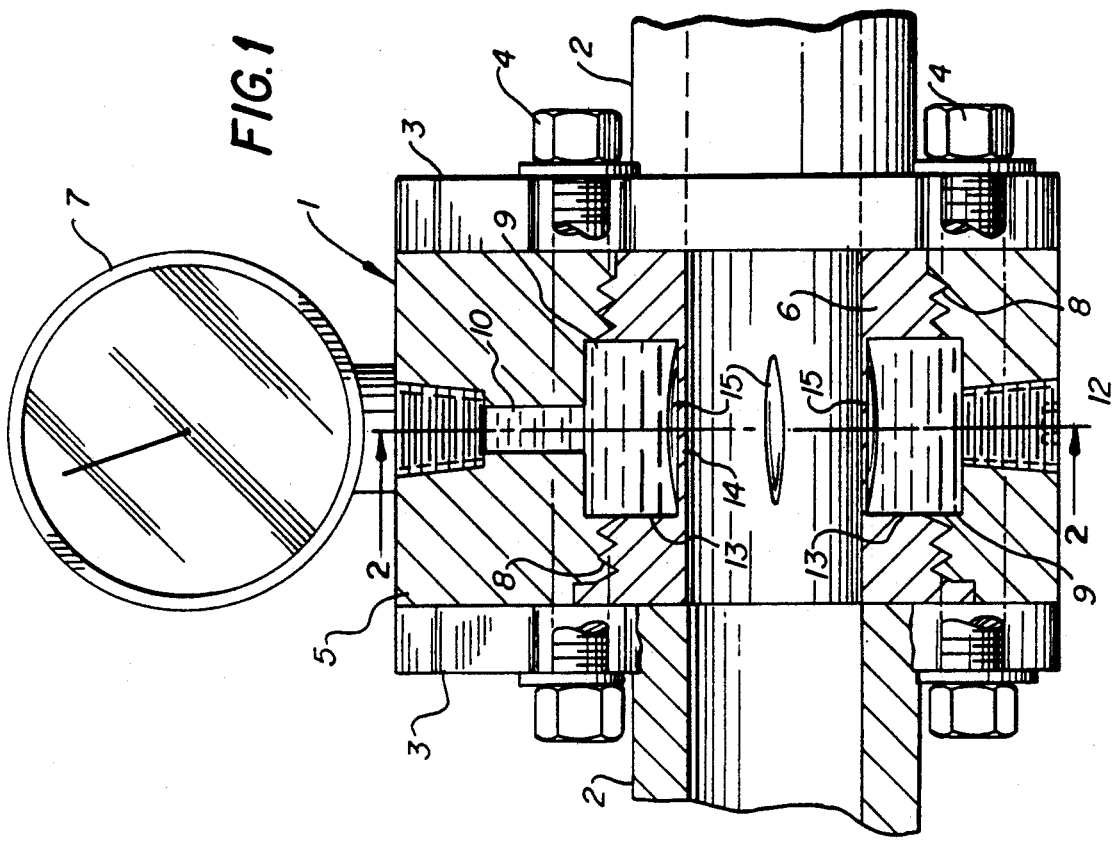
Figure 2:
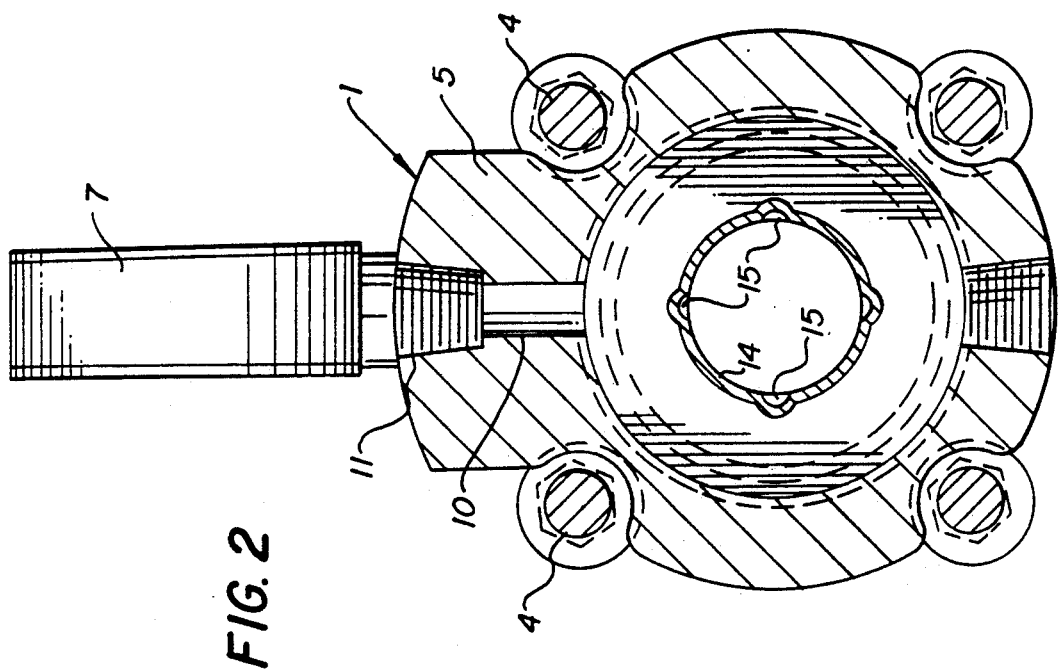

FIG. 1 is an elevational view partly in section of a pressure sensing device according to the present invention mounted in a pipeline, and FIG. 2 is a cross section view of the pressure sensing device along the line 2—2 of FIG. 1.

DETAILED DESCRIPTION OF THE INVENTION

Referring now more specifically to the drawings there is shown at 1 in FIG. 1 a pressure sensing device which is adapted to be inserted in a pipeline to sense the pressures of fluid passing through the pipeline. The pipeline is shown at 2 and the pipeline has flanges 3 extending around the entire periphery of the pipeline with apertures in the flanges to receive bolts 4. As seen in FIG. 2 the pressure sensing device 1 is fit between flanges 3 on pipeline 2 and is retained in position within the pipeline by bolts 4. When it is necessary to service the pressure sensor 1, it is merely necessary to unscrew the bolts 4 and remove the pressure sensor.

The pressure sensor according to the present invention comprises essentially three parts, a body member 5, a sleeve member 6 which is screw-fit within the body member 5 and a pressure gauge 7 which is screw-fit in an external bore in the body member 5.

The body member 5 comprises a ring shaped member having screw threads 8 at the end portions of the internal surface. The central portion of the internal surface of the body member has a circumferential recess 9 which is provided with a passageway 10 having a screw-threaded end portion 11 to receive the sensing port of pressure gauge 7. A fluid filling port 12 is also provided in the body member 5.

The sleeve member 6 has a recessed central portion 13 which extends around the entire external surface of the sleeve. The end portions of the sleeve 6 are screw-threaded to mesh with the screw-threaded end portions 8 of the body member 5. It can be seen in FIG. 1 that when the sleeve member 6 is fitted within the body member 5 the recess 9 in the body member aligns with the recessed portion 13 of the sleeve to form a chamber which extends around the entire periphery of the sleeve member and body member. The central portion of the sleeve member 6 comprises a thin wall which has a plurality of pressed out pleats or folds as shown at 15. As seen in FIG. 1 the pressed out portions are elliptically shaped and in the embodiment shown there are four such pressed out portions equidistantly spaced around the periphery of the internal surface of the sleeve 6.

In use a sleeve member 6 is screw-fit into the body member 5 so that the recess 9 in the body member and recess 13 in the sleeve member are aligned to form a sensing chamber. The sensing chamber and passageway 10 are filled through the filling port 12 and the filling port is subsequently plugged. The pressure sensing device is then inserted in a pipeline as shown in FIG. 1. Fluid passing through the pipeline will cause the thin walled central portion 14 of the sleeve 6 to move outwardly in response to pressures within the pipeline. It can be seen that the pressure sensing diaphragm 14 will respond to pressures around the entire periphery of the fluid stream passing through the pipeline. The pressed out portion 15 forming accordion-like folds or pleats within the diaphragm will permit the diaphragm to respond to both small pressure variations as well as large pressure fluctuations at any point around the pipeline.

It can be seen that the pressure sensing chamber formed by the recesses in the body member and sleeve member provides an isolating chamber to prevent any materials within the pipeline coming in contact with the pressure gauge 7. In the event that the pressure diaphragm formed by the central portion of the sleeve member 6 becomes damaged by corrosive materials or the like within the pipeline, the sleeve member 6 may be easily removed and replaced.

Obviously many modifications and variations of the present invention are possible in light of the above teachings.

What is claimed is new and is desired to be secured by Letters Patent is:

1. A pressure sensing device for sensing pressures within a pipeline, said pressure sensing device comprising an outer housing member and an inner replaceable cartridge member, said outer housing member having a central bore therein and at least one passageway extending through the outer housing member and adapted to receive a pressure gauge in said passageway, said inner replaceable cartridge having a central aperture therethrough of uniform diameter and comprising a thin circular pressure sensing wall in the central portion of the cartridge with rigid enlarged end flanges integrally formed with the pressure sensing wall, said inner replaceable cartridge adapted to slide within the central bore of the outer housing member, means for securing the inner replaceable cartridge within the bore of the outer housing member, the outer face of the thin circular pressure sensing wall together with the inner surface of the flanges on the replaceable cartridge and the inner face of the outer housing member forming a chamber, whereby pressures within a pipeline may be sensed by the thin walled pressure sensor and transmitted through fluid in the chamber to the pressure gauge and whereby the cartridge member including the integrally formed thin circular pressure sensing wall may be readily slid out of the outer housing member as a single unit in a particular direction of travel, removed and replaced within the outer housing member.

2. A pressure sensing device according to claim 1 and further including means formed within the thin circular pressure sensing wall to permit expansion and contraction of the pressure sensing wall in response to pressure variations in fluid passing through the inner replaceable cartridge.

3. A pressure sensing device according to claim 2 wherein said means to permit expansion and contraction of the pressure sensing wall comprises at least one accordion-like fold in the pressure sensing wall.

4. A pressure sensing device according to claim 3 wherein a plurality of accordion-like folds are equidistantly spaced around the surface of the pressure sensing wall.

* * * * *